United States Patent [19]
Budzich et al.

[11] 3,954,151
[45] May 4, 1976

[54] SAFETY CONTROL FOR MOBILE VEHICLES

[75] Inventors: Tadeusz Budzich, Moreland Hills, Ohio; Stanislaw Filip, Toronto, Canada

[73] Assignee: KLF Patents, Inventions, and Marketing Corporation Limited, Scarborough, Canada

[22] Filed: Apr. 29, 1974

[21] Appl. No.: 465,422

[52] U.S. Cl. .................. 180/103 R; 123/198 DC; 180/82 R
[51] Int. Cl.² .................................... B60K 28/00
[58] Field of Search.................. 180/103, 99, 82 R; 123/198 DC; 192/3 M; 74/513

[56] References Cited
UNITED STATES PATENTS

| | | | |
|---|---|---|---|
| 2,139,569 | 12/1938 | Alvarado | 180/103 |
| 3,620,324 | 11/1971 | Smitley | 123/198 DC X |
| 3,626,919 | 12/1971 | MacMillan | 180/82 R X |
| 3,722,492 | 3/1973 | Shibata | 180/82 R X |
| 3,731,667 | 5/1973 | MacMillan | 180/82 R X |
| 3,758,736 | 9/1973 | Tanaka | 180/103 X |
| 3,798,402 | 3/1974 | Raab | 123/198 DC X |
| 3,830,213 | 8/1974 | Herman | 123/198 R X |

FOREIGN PATENTS OR APPLICATIONS

| | | | |
|---|---|---|---|
| 698,212 | 11/1964 | Canada | 180/103 |
| 1,916,575 | 10/1970 | Germany | 192/3 M |

*Primary Examiner*—Robert R. Song
*Assistant Examiner*—Terrance L. Siemens

[57] ABSTRACT

A safety control system for use in mobile vehicles driven by a throttle controlled engine. The safety control system, upon actuation of the vehicle brakes, automatically brings the engine throttle into its idling position, irrespective of the setting of the engine throttle control and maintains it in this position as long as the vehicle brakes are being applied. The safety control system also brings the engine throttle into its idling position upon return of the throttle control lever to its idling position, irrespective of the position of the throttle control cable connecting engine throttle and throttle control lever.

13 Claims, 6 Drawing Figures

SAFETY CONTROL FOR MOBILE VEHICLES

BACKGROUND OF THE INVENTION

This invention relates generally to a safety control system for use in mobile vehicles driven by a throttle controlled internal combustion engine.

In more particular aspects this invention relates to a safety control system, which brings the throttle controlled internal combustion engine speed to idle, upon application of vehicle brakes, or upon return of throttle control lever to the idling position, irrespective of the position of the throttle control cable.

When braking an automobile, the drive automatically takes his foot off the throttle pedal and then applies the brakes. Therefore, during the braking operation, the engine throttle is permitted to return to its idling position. In some of the recreational type vehicles this sequence of operation is not necessarily followed. For example, on a motorcycle, during a panic stop, the driver may try to apply brakes with the engine throttle wide open, thus affecting the distance in which the vehicle can be stopped. Also, an even more dangerous condition can exist in a recreational type vehicle like a snowmobile, where due to ambient conditions, quite frequently, the throttle control can become frozen in a partially or fully open position. Since the snowmobile brakes are not capable of stopping the vehicle against the engine power, this might result in a serious accident. Also, with the throttle control cable frozen in an open throttle position if the driver is thrown off the snowmobile, the snowmobile will continue moving, leaving the driver stranded possibly in deep snow and in a remote region.

SUMMARY OF THE INVENTION

It is therefore a principal object of this invention to provide an improved safety control system, whereby an application of vehicle brakes will automatically bring the engine throttle into its idling speed position.

It is another object of this invention to provide a safety control system which will, upon application of vehicle brakes, automatically bring the engine throttle to its idling speed position, irrespective of the setting of the throttle control lever or pedal and maintain it in this position as long as the vehicle brakes are being actuated.

It is still another object of this invention to reactivate the engine throttle control upon release of the vehicle brakes and return the throttle control lever or pedal to the engine idling position.

It is still another object of this invention to provide a safety control system in which when the throttle control lever is released by the operator the engine throttle will be brought into idling position irrespective of the position of the throttle control cable.

Additional objects of the invention will become apparent when referring to the preferred embodiment of the invention, as shown in the accompanying drawings and described in the following detailed description.

DESCRIPTION OF THE PREFERRED EMBODIMENT

Figure 1:
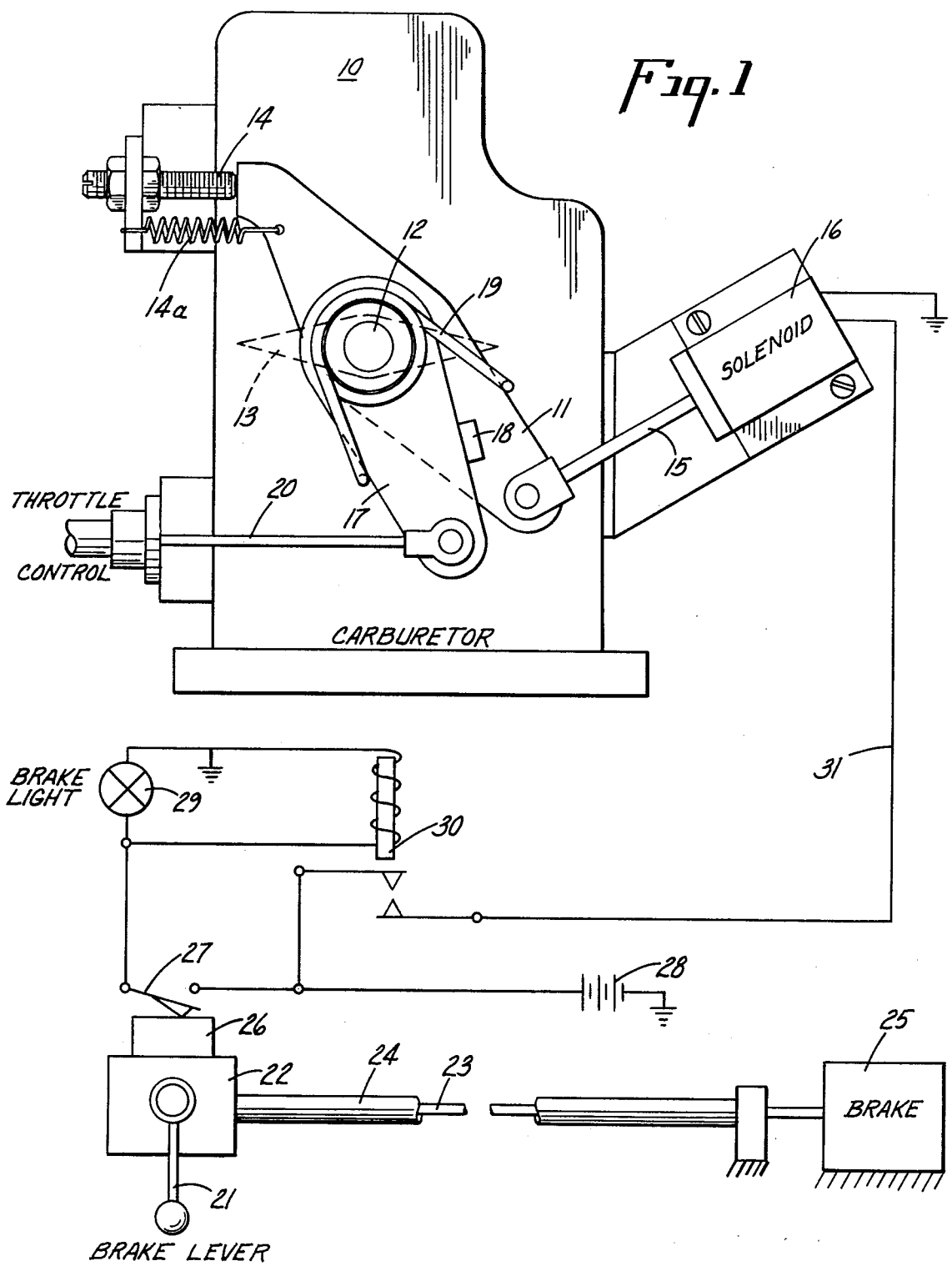
FIG. 1 is a diagramatic representation of a safety control system including an engine, carburetor and vehicle brakes.

Referring now to the drawings, and for the present to FIG. 1, an engine carburetor is shown as 10. A throttle lever 11 is connected through pin 12 to carburetor butterfly valve 13, shown in dotted lines. Rotation of throttle lever 11 will rotate carburetor butterfly valve 13, which in turn will regulate the speed of the engine, not shown. The throttle lever 11 is biased by a spring 14a towards adjustable stop 14, which corresponds to the idling position of the engine throttle. The throttle lever 11 is connected by flexible cable 15 to a solenoid 16. With solenoid 16 not energized, the solenoid plunger, secured to flexible cable 15, will move with the throttle lever 11.

A second throttle lever 17 is pivoted on pin 12 and maintained in contact with stop 18, on throttle lever 11, by a preload in torsion spring 19. As long as the preload in the torsion spring 19 is not exceeded, the throttle lever 11 and second throttle lever 17 will revolve together, controlling the position of the butterfly valve 13. Throttle control cable 20 is connected to the second throttle lever 17 and leads to the throttle control actuating mechanism, not shown.

Brake lever 21, mounted on a bracket 22, is connected by a control cable 23, guided in casing 24, to diagramatically shown vehicle brake 25. Movement of the brake lever 21 will also move (through a mechanism not shown) plunger 26, which will close the contact of schematically shown electrical switch 27. Closing of the switch 27 will connect a battery 28 to brake light 29 and relay, generally designated as 30, which will further connect battery 28 through wires 31 with solenoid 16. Force developed in energized solenoid 16, transmitted through cable 15, will rotate the throttle lever 11 anti-clockwise against stop 14, to a position corresponding to the engine idling speed. If during the application of brakes the assembly of throttle levers 11 and 17 is maintained by the throttle control cable 20 in any other position than that corresponding to idling engine speed, the second throttle lever 17 will remain stationary, but throttle lever 11, under action of solenoid 16, will rotate towards engagement with stop 14 against biasing force of torsion spring 19, the stop 18 coming out of contact with second throttle lever 17. Therefore during application of the vehicle brakes the solenoid 16 will maintain the carburetor 10 in the position corresponding to engine idling speed, irrespective of the setting of the throttle control cable 20. Return of the brake lever 21 to neutral will de-energize the solenoid 16. The torsion spring 19 will then automatically rotate the throttle lever 11 to the position, where the stop 18 will engage second throttle lever 17.

Figure 2:
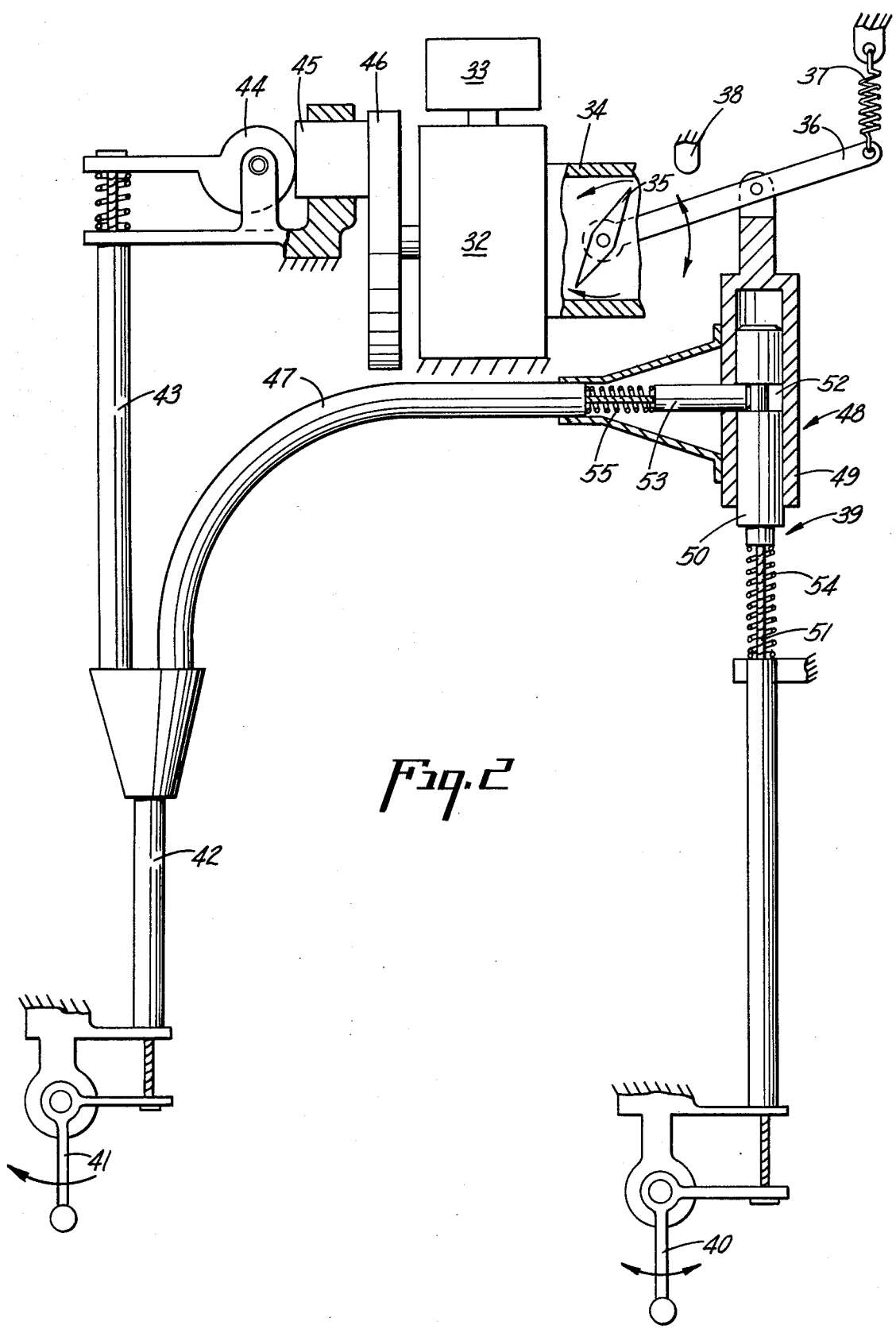
FIG. 2 is a diagramatic representation of a safety control system, in which the control signal from the brake lever is transmitted to the engine throttle control by a control cable.

Referring now to FIG. 2, diagramatically shown engine 32, which drives transmission 33, is equipped with a carburetor 34 having a butterfly valve 35, operated by a throttle lever 36. The throttle lever 36 is biased by spring 37 towards stop 38, equivalent to engine idling position. The throttle lever 36 is connected by control cable assembly, generally designated as 39, to throttle control lever 40. A brake control lever 41 is connected by cables 42 and 43 with brake cam 44. Brake cam 44 engages through brake shoe 45 brake disc 46, connected to engine 32. The brake control lever 41 is also connected by the cable 42 and cable 47 to a latching mechanism, generally designated as 48, which is part of control cable assembly 39.

The latching mechanism 48 has sleeve 49 guiding a stem 50 connected to a throttle control cable 51. The stem 50 is provided with a circumferential groove 52, engaged by a latching pin 53, connected to the cable 47. The stem 50 is biased by spring 54 in the direction of the throttle lever 36, and latching pin 53 is biased towards engagement with groove 52, of stem 50, by biasing spring 55.

With the latching pin 53 in the position as shown, sleeve 49 and stem 50 are locked together and the movement of the throttle control lever 40 will be transmitted directly to throttle lever 36 and butterfly valve 35 by movement of the entire latching mechanism 48 thereby regulating the speed of the engine 32. The brake cable 47 will flex with the movement of the latching mechansim 48, permitting regulation of the engine speed. Movement of the brake lever 41 will rotate the brake cam 44 through the action of cable 43. Also, movement of the brake lever 41 through the action of cable 47 will pull the latch pin 53 from engagement with groove 52 of stem 50. When the stem 50 becomes disengaged from sleeve 49, the sleeve 49 is freely movable independently of the stem 50 and the spring 37 will move the sleeve 49 upwardly (as viewed in FIG. 3) thus rotating the throttle lever 36 anti-clockwise against the stop 38 and therefore will bring the engine throttle to its idling position. During this movement of the sleeve 49, the stem 50 will remain stationary.

Further movement of brake lever 41, through brake cam 44, will force the brake shoe 45 against brake disc 46, braking the vehicle and moving the latching pin 53 further out of contact with stem 50.

Following braking of the vehicle, when the brake lever 41 is returned to the neutral or non-braking position, the vehicle braking operation is stopped. Also, the latching pin 53, under action of spring 55 is biased toward the stem 50. If the throttle control lever is in the actuated position, as contrasted to the idle position, the groove 52 will be out of alignment with the pin 53, and hence the pin 53 will strike the surface of the stem 50 at a location spaced from the groove 52. In order to reengage the pin 53 in the groove 52, the throttle control lever 40 must be moved to the idle position which will move stem 50, under action of spring 54, in respect to sleeve 49, until the latching pin 53, under action of the spring 55, reengages the groove 52, locking stem 50 and sleeve 49 into one assembly capable of transmitting force and motion from the throttle control lever 40 to the throttle lever 36.

Therefore each application of vehicle brakes will, by disengaging the throttle control assembly 39, bring the engine throttle control to its idling position, and the throttle control assembly can be re-connected only by bringing throttle control lever 40 to the engine idle position.

Figure 3:
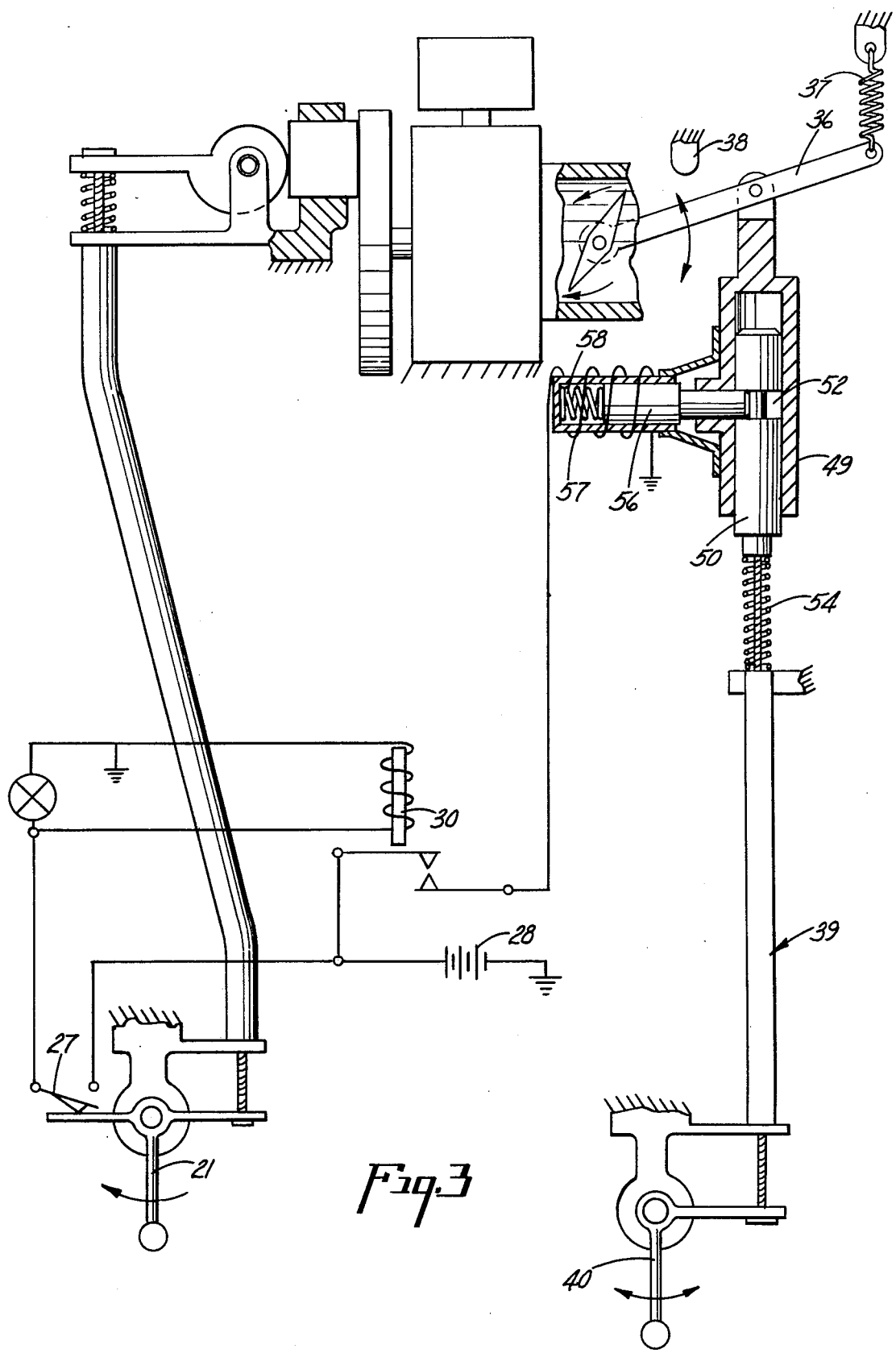
FIG. 3 is a diagramatic representation of a safety control system in which the control signal from the brake lever is transmitted electrically to a solenoid, operating a disconnecting mechanism of the engine throttle control.

Referring now to FIG. 3, another embodiment of the invention is shown in which the operation and the major components of the system are similar to that of FIG. 2, except that the latching pin 56 instead of being operated by a cable is connected to and operated by a solenoid 57, which is energized by the switch 27 and relay 30. Movement of the brake lever 31 will close switch 27 and connect, through relay 30, the battery 28 with the solenoid 57. The latching pin 56 will be disengaged from the groove 52 of stem 50 against the force of spring 58. The spring 37 will then return the throttle lever 36 against stop 38 and bring the engine throttle to its idling speed position as previously described. When the brake lever 21 is returned to neutral, the solenoid 57 becomes de-energized and the latching pin 56, under action of spring 58, comes in contact with the surface of the stem 50. With throttle control lever 40 returned to its engine idling position the stem 50, under action of spring 54, moves relative to sleeve 49 until the groove 52 becomes engaged by latching pin 56. The throttle control cable assembly 39 is then capable of transmitting motion and force from throttle control lever 40 to throttle lever 36, controlling the engine speed, all as previously described.

Figure 4:
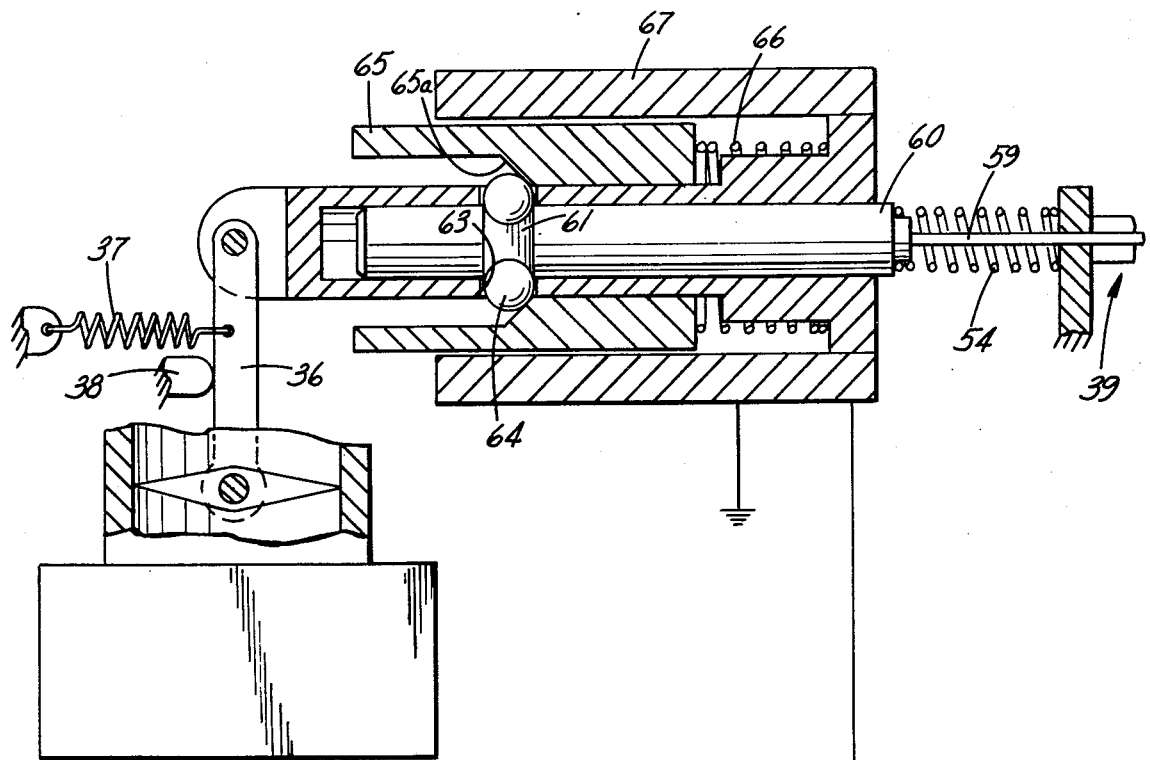
FIG. 4 is a diagramatic representation of a safety control system, using a different type of solenoid operated disconnecting mechanism of FIG. 3.
Figure 4:
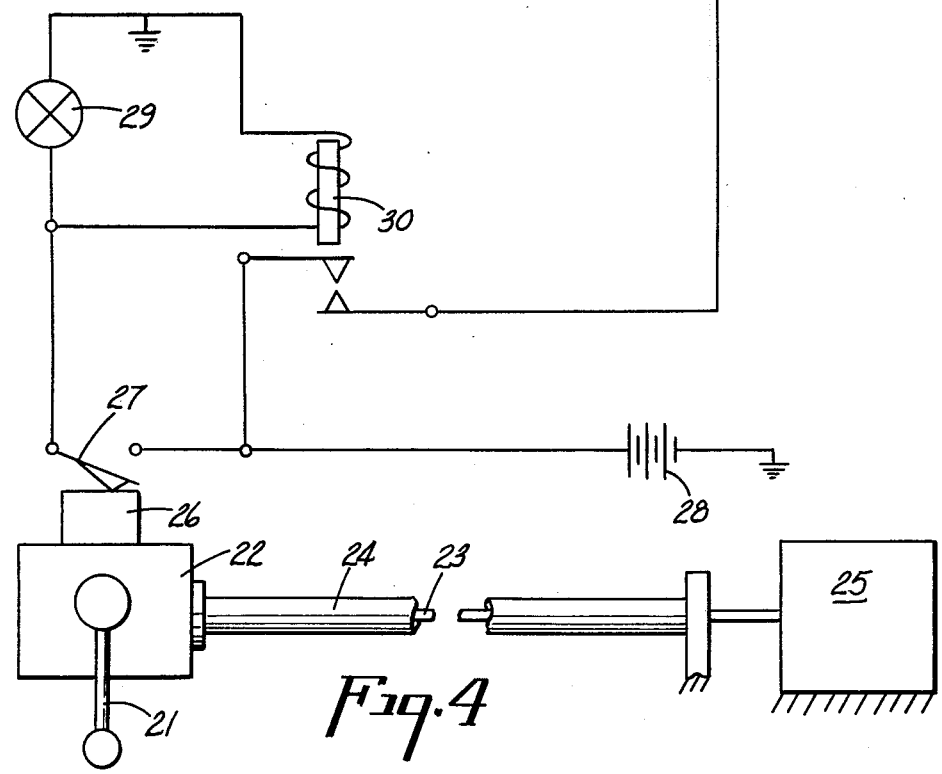

Referring now to FIG. 4 yet another embodiment of the invention is shown, the structure and operation of which is similar to that of FIG. 3, with the exception of the latching mechanism. A different type of latching mechanism in the throttle control cable assembly is used. Motion of the throttle control lever, not shown, is transmitted through cable control assembly 39 to cable 59, which is connected to stem 60, equipped with a groove 61. Stem 60 is guided in sleeve 62, connected to the throttle lever 36. The sleeve 62 has a plurality of circumferentially spaced openings 63 guiding detent balls 64. Cam sleeve 65 having a cam surface 65a, is guided on the sleeve 62 and biased by spring 66, in a direction urging engagement of surface 65a with balls 64. Solenoid coil 67, when energized, moves the cam sleeve 65 against bias of spring 66, disengaging the balls 64 from surface 65a and therefore permitting the disengagement of stem 60 from sleeve 62. This permits the throttle lever 36, under action of spring 37, to come in contact with stop 38, bringing the engine throttle to its idling speed position. With solenoid coil 67 de-energized surface 65a, under action of spring 66, engages the balls 64, which in turn engage surface of the stem 60. With movement of the throttle cable 59 the stem 60, under action of spring 54, will move relative to sleeve 62, until the balls 64 reengage the groove 61. Upon this re-engagement, force and motion from the throttle control lever, not shown, can be transmitted through throttle cable 59 to throttle lever 36, to control the speed of the engine.

Figures 5, 6:
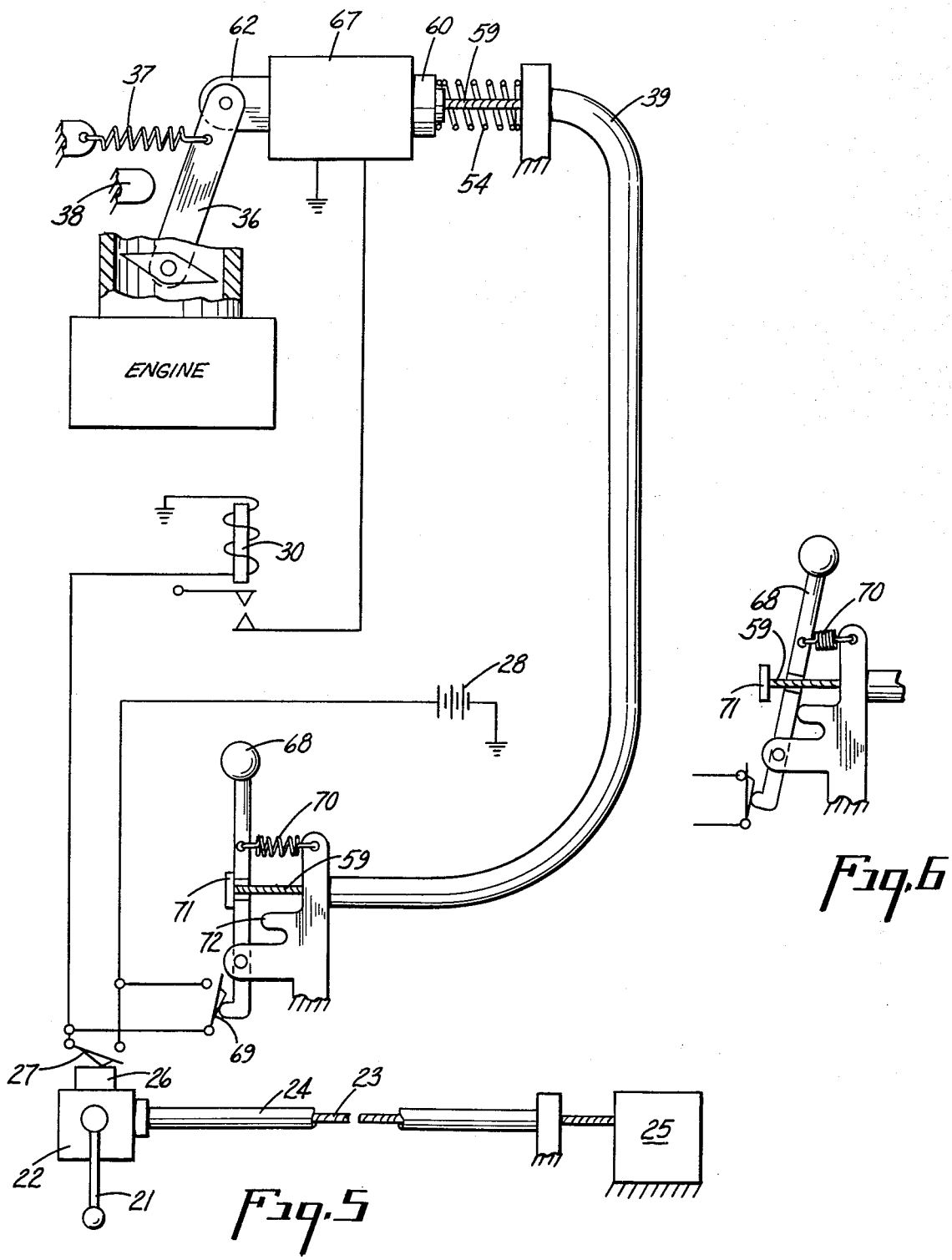
FIG. 5 is a diagramatic representation of a safety control system, in which a control signal from either the brake lever or a control signal from the throttle control lever returned to idling position is transmitted electrically to a solenoid opening a disconnecting mechanism of the engine throttle control.
FIG. 6 is a view of a throttle control lever in released position with a throttle cable in a jammed or frozen position.

Referring now to FIG. 5, yet another embodiment of the invention is shown wherein the engine is brought to idle when the throttle lever is returned to the idle position even though the throttle cable is frozen, or for some other reason malfunctions and does not respond to the throttle lever. This is shown in conjunction with a system which idles the engine upon application of the brake lever as in previous embodiments, but it need not be so combined. The structure and operation of the safety brake system are similar to that shown in FIG. 3. In a manner as previously described, movement of the brake lever 21 will close switch 27, which will energize solenoid 67, disconnecting throttle cable 59 from throttle lever 36. The throttle lever 36, actuated by spring 37, will move the engine throttle to its idling position.

The throttle control lever 68 engages a ferrule 71, attached to throttle cable 59, which is connected through solenoid 67 to throttle lever 36. The throttle cable 59 transmits motion from throttle control lever 68 to throttle lever 36, regulating the speed of the engine.

When the throttle control lever 68 is brought against stop 72, switch 69 is closed, energizing solenoid 67 and therefore disconnecting the throttle cable 59 from throttle lever 36. With throttle cable 59 jammed or frozen in a position equivalent to a specific engine speed, the throttle control lever 68 can leave the ferrule 71 as shown in FIG. 6 and can be brought against stop 72, where it will activate switch 69, and, in a manner as previously described, disconnect the throttle cable 59 from throttle lever 36. Similarly when throttle control lever 68 is released by the operator, the spring 70 will bring it automatically against stop 72, irrespective of the position of the throttle cable 59, in a manner as previously described, disconnecting throttle cable 59 from throttle lever 36. With the throttle cable frozen or jammed in a position, equivalent to open engine throttle, the spring 54 will not be able to reengage throttle cable 59 to throttle lever 36. Under such conditions the engine will automatically remain at its idling speed as long as the throttle control cable remains jammed. This safety feature becomes especially important, when during vehicle operation, the throttle cable becomes frozen and the operator is thrown from the snowmobile. Under such conditions the throttle control lever 68, actuated by spring 70, through switch 69, will energize solenoid 67, disconnecting the throttle lever 36 from throttle cable 59, bringing the engine to its idling speed and stopping the vehicle.

What is claimed is:

1. In a mobile vehicle comprising a frame, propelling means attached to said frame, an engine mounted on said frame and operably connected to said propelling means to impart motion to said vehicle, engine speed control means including engine throttling means, spring biasing means biasing said engine throttling means towards engine idling position, speed control setting means including mechanical motion transmitting means arranged to operate said engine throttling means, vehicle brake means and vehicle brake actuating means, the combination therewith of a safety control system interposed between said engine throttling means and said mechanical motion transmitting means of said speed control setting means, said safety control system having signal generating means disposed to generate a signal responsive to at least one given operator action, and disconnecting means responsive to said signal from said signal generating means disposed to actuate said disconnecting means, disconnecting said mechanical motion transmitting means of said speed control setting means from said engine throttle means thereby permitting said engine throttling means to bring the engine to the idling condition irrespective of the position of said mechanical motion transmitting means and said engine throttling means.

2. The combination of claim 1 further characterized by said signal generating means having means disposed to generate said signal responsive to position of said speed control setting means.

3. The combination of claim 1 further characterized by said signal generating means having means disposed to generate said signal responsive to an actuated position of said brake actuating means.

4. The combination of claim 1 further characterized by said signal generating means having first means disposed to generate said signal responsive to the position of said speed control setting means and second means disposed to generate said signal responsive to an actuated position of said brake actuating means.

5. The combination of claim 3 further characterized by said brake actuating means having cable control means operably connecting said disconnecting means to said brake actuating means.

6. The combination of claim 1 further characterized by solenoid means disposed to operate said disconnecting means, and said signal generating means having solenoid actuating means operably connected to said solenoid means.

7. The conbination of claim 6 further characterized by said disconnecting means having locking means, spring means biasing said locking means towards a position connecting said engine throttling means to said speed control setting means and solenoid means operable through said locking means disposed to disconnect said engine throttling means from said speed control setting means.

8. The conbination of claim 7 further characterized by said locking means having rod means connected to said speed control setting means, said rod means having groove means, and plunger means operable by said solenoid means to engage and disengage said groove means.

9. The combination of claim 7 further characterized by said locking means interconnecting said engine speed control setting means and said engine throttling means, said locking means including rod means having groove means, and sleeve means, said sleeve means having circumferentially speced holes, ball means guided in said holes and arranged to engage and disengage said groove means, solenoid actuated cam means guided on said sleeve means and arranged to operate said ball means, spring means to bias said cam means towards engagement with said ball means and solenoid means to disengage said cam means from said ball means.

10. The combination of claim 6 further characterized by said solenoid actuating means having switching means responsive to a given position of said brake actuating means.

11. The combination of claim 6 further characterized by said solenoid actuating means having switching means responsive to a given position of said speed control setting means.

12. The combination of claim 6 further characterized by said solenoid actuating means having first switching means responsive to said brake actuating means and second switching means responsive to said speed control setting means.

13. The combination of claim 11 further characterized by said speed control setting means having control lever means, throttle control cable means operably connecting said control lever means and said disconnecting means, first spring means biasing said throttle control cable means towards engagement with said disconnecting means and said control lever means and second spring means biasing said control lever means towards disengagement with said throttle control cable means and engagement with said second switching means.

* * * * *